United States Patent

Schulmeiss

Patent Number: 5,717,847
Date of Patent: Feb. 10, 1998

[54] METHOD FOR GENERATING PLANE TECHNICAL CURVES OR CONTOURS

[76] Inventor: Traugott Schulmeiss, Platanenstrasse 10, 07747 Jena, Germany

[21] Appl. No.: 481,451

[22] PCT Filed: Dec. 23, 1993

[86] PCT No.: PCT/DE93/01252

§ 371 Date: Sep. 11, 1995

§ 102(e) Date: Sep. 11, 1995

[87] PCT Pub. No.: WO94/15267

PCT Pub. Date: Jul. 7, 1994

[30] Foreign Application Priority Data

Dec. 24, 1992 [DE] Germany ............ 42 44 462.4

[51] Int. Cl.[6] .................................. G06F 15/00
[52] U.S. Cl. ........................................ 395/142
[58] Field of Search ........................ 395/142, 140, 395/143; 345/133, 16, 17

[56] References Cited

FOREIGN PATENT DOCUMENTS

| 0568360 | 4/1993 | European Pat. Off. . |
| 9415267 | 7/1994 | WIPO . |

OTHER PUBLICATIONS

Hoschek, Circular Splines, Nov. 1992, Computer Aid Design pp. 611–617.
Wu et al., Curve Algorithms, 1989, IEEE Computer Graphics and Applications, No. 3, pp. 56–69.
McIlroy, Getting Raster Ellipses Right, AT&T Bell Lab, pp. 260–275, 1992.

*Primary Examiner*—Phu K. Nguyen
*Attorney, Agent, or Firm*—Schweitzer Cornman Gross & Bondell LLP

[57] ABSTRACT

The application relates to a process for generating plane curves or contours for representing technical images by consecutively generating coordinates by digitizing parametric, polynomial and rational third order Bezier curves.

4 Claims, 1 Drawing Sheet

Octant 1

METHOD FOR GENERATING PLANE TECHNICAL CURVES OR CONTOURS

FIELD OF THE INVENTION

The invention relates to a method for generating plane technical curves or contours for technical equipment, in which plane, curved, geometric objects must be represented or generated on a partially large scale in very high resolution and/or under real time requirements. The inventive solution enables digital approximations for special plane curves in the area of graphic data processing to be generated rapidly and accurately.

BACKGROUND

The splines considered are used in graphic design systems as efficient and flexible means for describing curved, linear and 2-dimensional geometric objects and for approximately describing mathematically complicated curves. Digital approximations (discretizations) of the splines are required for the graphic representation of the objects described by splines in a square grid as well as for energizing technical equipment, which illuminate objects described by splines in a square grid or convert them in some other form for generating curves, contours or surfaces. Such uses are, for example, laser illuminators (printers, plotters, etc.), microlithography with electron beams or x-ray beams, microsystem technology, binary and integrated optics, manufacture of optical wave guides, 2-D robot controls, printing technology and the visualization of design data.

In many technical areas, graphic design systems are indispensable tools for product development and for generating manufacturing data. In classical fields, such as machinery, automobile, ship and aircraft construction or for the development of microelectronic circuits, there are efficient, complex and, in some cases, highly automated design systems. It is characteristic of these that they use splines, preferably parametric, cubic splines, for modeling curved plane or spatial curves and surfaces.

Splines combine the advantages of flexibility and universality as a design aid with simple computerized manageability and low data requirements for describing even complicated objects. Until a few years ago, polynomial splines were used exclusively. Now, however, rational splines offer greater design leeway while the increase in calculations is only insignificant and find acceptance in newer design systems and also as geometric primitives in computer graphic standards. A further advantage of rational splines consists therein that they represent quadratic curves (arcs of circles, ellipses, parabolas, hyperbolas) exactly.

To visualize the results of the design and to energize technical equipment, which converts the designs into industrial products, coordinate-controlled devices with a maximum, discrete coordinate resolution are generally used. Therefore only points of a square grid can be coded and selected and the object arises of generating digital approximations for curves and contours described by splines. This is a data-intensive process, which requires much computing time.

With the development of the microstructure technology, technical applications arise, for which there are not yet any specialized, graphic design systems and which place greater demands on digitizing. The resolution is increased significantly and the numbers of grid points, which must be generated, and, with that, the computing times required increase greatly. Designs become necessary, for which complete digitizing would lead to unjustifiably large quantities of data and for which, therefore, digitizing must take place parallel to the technical control process and accordingly under real time conditions. The accuracy required for the contours produced is growing.

On the whole, the status of design technology in this and similar fields is characterized in that the problem of digitizing cubic splines is an impediment to their use for modeling, curved geometric objects. Arcs of circles or ellipses are used instead. Rapid and simple methods exist for digitizing them exactly. On the other hand, complicated arcs are approximated by (data-intensive and imprecise) polygonal courses. In some systems, the necessary computing time is shortened owing to the fact that polynomial quadratic splines can be used exclusively.

Advisably, different conventional classes of splines can be converted for digitizing by simple transformations into Bezier curves. According to the state of the art, a Bezier curve (x(t), y(t)) of the de Casteljau algorithm or a method related to the Horner scheme is used for calculating individual curve points. (G. Farin: Curves and Surfaces for CAGD, Academic Press 1990). The digital approximation of a curve is composed of digital approximations of segments lying between calculated curve points. This method has three disadvantages, which are important particularly for applications in innovative technical areas:

1. The number of computing steps and the time required for them to calculate a curve point are relatively high, particularly in the case of rational (non-polynomial) splines.
2. A narrower step width of the parameter t, with which individual curve points are calculated, must be selected in regions of great curvature or of large changes in the coordinates of a curve than in other regions. This adaptation requires additional expense. Without this adaptation, there are either losses in efficiency or losses in accuracy.
3. It cannot be guaranteed that the distance parallel to the coordinates axis of each grid point produced is less than or equal to half the grid step width of the exact spline curve, not even when the step width of the parameter t is extremely small. An exact method can guarantee this maximum error.

A recursive use of the de Casteljau algorithm, which avoids the third disadvantage, was given in D. E. Knuth: Computers & Typesetting; D. Addison Wesley 1986. However, it requires much computing time since, in unfavorable cases, the number of curve points, which must be calculated in a complicated manner, is comparable with the number of grid points produced.

In the publication (Knuth), the so-called octantal division was also described. It simplifies the method for generating a spline arc, in that it divides a spline curve into sections at the maxima and minima of x(t) or y(t) and at those points, at which the slope of the tangents to the curve is +1 or −1. The generation of the individual sections is then traced back to the generation of an arc in a standard position. This procedure is taken over in the innovation proposed here. However, the parametric Bezier curve is not the starting point for the generation; instead, this curve is transformed for this purpose into an implied cubic curve f(x,y)=0 with a cubic polynomial f.

On the other hand, in the similar method for the digital approximation of an implied quadratic curve F(x,y)=0, described in U.S. Pat. No. 4,789,954, a check is carried out for the generation of each individual grid point whether an octantal change and, with that, a change in the rules for computing are required in the curve tracking. The computing steps necessary for this are carried out outside of the arc-generating loop and only once in the method proposed here, as a result of which the aimed-for generation of arcs in high resolution is accelerated appreciably.

The method described in the above-named patent is able to generate a quadratic curve in one go, since an octantal change is recognized automatically and integrated into the course. However, in order to keep the computation operations simple, this advantage is obtained at the disadvantage that the approximation error of a generated grid point may amount to a whole grid step, that is, to twice the maximum error that can be guaranteed.

DESCRIPTION OF THE INVENTION

Figure 1:
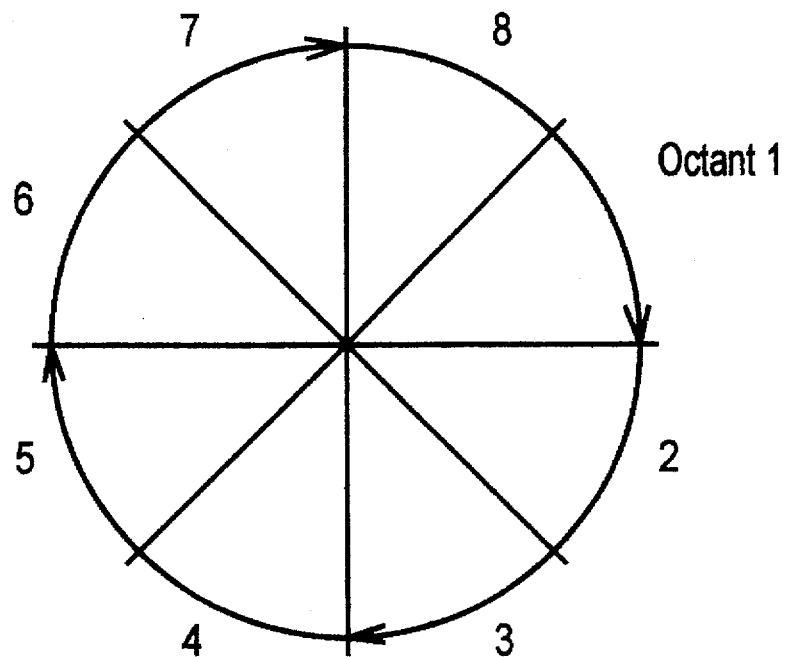
FIG. 1 shows the determination of or the Octanol Division.

The invention, is based on the problem of providing a method for generating plane technical curves or contours for representing technical images, which generates consecutive grid points in the x-y plane with the fewest number of computing operations possible by means of digitizing parametric, polynomial and rational cubic Bezier curves. Moreover, the method shall guarantee the least possible error in the grid points generated and avoid the problems of selecting the appropriate step width in the calculation of curve points. Furthermore, the proposed method shall keep the computational effort in preparation for the generation of the individual arcs as small as possible.

This problem is solved owing to the fact that, for digitizing parametric, rational or polynomial cubic Bezier curves of the form $$X(t) = \frac{X_0(1-t)^3 + 3pX_1t(1-t)^2 + 3qX_2t^2(1-t) + X_3t^3}{(1-t)^3 + 3pt(1-t)^2 + 3qt^2(1-t) + t^3}$$

$$(0<=t<=1)$$

with the control points $X_i=(x_i, y_i)$ ($0<=i<=3$), the weights $p, q>0$, and the parameters $t$ with $0<=t<=1$ these are decomposed into octantal arcs, which are generated separately, in such a manner that the boundaries of the octantal arcs are determined by the parameter $t$ at the points of the curve where the latter has the slope $0$, $\infty$, $1$ or $-1$, that subsequently the curves, in order to free them from the parameterization, are transformed into an implied form $f(x,y)=0$, that an additional curve division of the Bezier curve takes place at the places at which $f(x,y)=0$ intersects itself and, after that, the coordinates of all dividing points are calculated from the corresponding parameter values, the dividing points, together with the starting and end points of the original curve, forming the starting and end points of all individual arcs, that these arcs are brought into the standard position through reflections at one or several of the three axes $x=0$, $y=0$ or $x=y$, that the generation of the digital approximation commences with the determination of the grid point $(x_0, y_0)$ adjacent to the starting point of the arc, the octantal divisions and the reflections ensuring that that the slope of the arc is always between 0 and 1, that subsequently the function $f(x_0+1, y_0+\frac{1}{2})$ is calculated, this calculation and the evaluation of the algebraic sign of $f$ in $(x_0+1, y_0+\frac{1}{2})$ making it possible to decide between which grid point and test point the arc runs and that subsequently this grid point forms the starting point for the next step until the end point of the arc is reached.

The starting point of the inventive method is the standard form of a rational cubic Bezier curve $$\frac{X_0(1-t)^3 + 3pX_1t(1-t)^2 + 3qX_2t^2(1-t) + X_3t^3}{(1-t)^3 + 3pt(1-t)^2 + 3qt^2(1-t) + t^3}$$

with the control points $X_i=(x_i, y_i)$ ($0<=i<=3$), the weights $p, q>0$, and the parameters $t$ with $0<=t<=1$ In the event that $p=q=1$, the denominator polynomial is equal to 1 and the Bezier curve is polynomial. Bezier curves, which deviate from the standard form and for which the control points $X_0$ or $X_3$ are provided with weights differing from 1, can be transformed into the standard form by a simple parametric transformation.

For the rapid generation of grid points, it is necessary to divide the curve into so-called octantal arcs and to generate these separately. For this purpose, those parameter values $t$ are determined, for which the curve has a horizontal or perpendicular tangent or a tangent with the slope of +1 or -1. This is accomplished by solving 4 equations of degree 4, which in each case have at most two solutions in the parameter interval (0,1). In the proposed method, the polynomials of degree 4 are represented as Bezier functions and their zero positions are determined recursively by a rapid geometric method.

Parameterization is eliminated by changing over to a parameterless implied form $f(x,y)=0$ with a polynomial $f$, which is cubic in x and y. This representation is provided by the Bezout resultant, a 3-row determinant, the elements of which are polynomials linear in x and y. From this representation, the coefficients of $f$ can easily be obtained by inserting suitably selected coordinate pairs into the curve equation and solving the resulting homogeneous linear equation system.

The implied curve equation continues the given Bezier curve in the whole of the x-y plane. For algorithmic reasons, the Bezier curve must be divided additionally at those places, at which $f=0$ has the property of intersecting itself, even if the original Bezier curve does not have this property. The associated parameter values are calculated from the Bezier form without any problems by solving a quadratic equation.

The coordinates of the dividing points are determined from the parameter values of all the dividing points. Together with the starting and end points of the original curve, they form the starting and end points of all individual arcs. Each of these arcs is brought into the standard position by a selection from the transformations of the reflection at the straight line $x=0$, at the straight line $y=0$ and at the straight line $x=y$. The standard position is characterized in that the directional vector $(dx, dy)$ has positive coordinates from the starting point of the arc to the end point and that $dx>=dy$. By means of a possible negation of the transformed polynomial $f$, it is ensured that the points below the are provide positive values when inserted into the curve equation.

The generation of the digital approximation commences with the determination of the grid point $(x_0, y_0)$ adjacent to the starting point of the arc. By means of the octantal division and the transformation that has been carried out, it is ensured that the slope of the arc at each point is between 0 and 1. With that, at the abscissa value $x_0+1$, only the points $(x_0+1, y_0)$ and $(x_0+1, y_0+1)$ come into consideration as grid points with a minimum distance from the curve. The calculation of $f(x_0+1, y_0+\frac{1}{2})$ and the evaluation of the algebraic sign of f at this test point make it possible to decide which is the grid point and test point, between which the arc runs. This grid point is only the starting point for the next step etc. until the end point of the arc is reached.

In addition to the function value at the test point, 2 correction values of the first order for the function value and three correction values of the second order for the corrections of the first order must be calculated. Together with four constant correction values of the third order, they enable all parameters used to be actualized incrementally, depending on the decision made for the transition to the next test point.

The digital approximation is described completely by the decisions when in each case only one coordinate or both are to be incremented simultaneously in the digitized arc. For the further processing of the data, only an inverse transformation of the arc starting points and a re-interpretation of the coordinate steps is necessary.

DETAILED DESCRIPTION OF THE METHOD

1. Determination of the Parameter Values for the Octantal Division

A plane, cubic, rational Bezier curve in standard form $$X(t) = \frac{X_0(1-t)^3 + 3pX_1t(1-t)^2 + 3qX_2t^2(1-t) + X_3t^3}{(1-t)^3 + 3pt(1-t)^2 + 3qt^2(1-t) + t^3} \quad (0<=t<=1),$$

is to be digitized. When the curve is transversed for increasing parameter values t, the traversing octant of the tangential vector $(x'(t), y'(t))$ to the curve, in analogy to the traversing of an arc of a circle, can usually change repeatedly. Between the changes, within a so-called octantal arc, the digitized curve has an unambiguous direction of advance (x or y direction), a certain traversing direction (in the direction of increasing or decreasing coordinates), and the increments from grid point to grid point orthogonal to the direction of advance have a fixed algebraic sign (positive or negative). The 8 octants can be characterized in the following way:

| Octant | Direction of Advance | Direction of Traverse | Orthogonal Increment |
| --- | --- | --- | --- |
| 1 | y | − | +1 |
| 2 | y | − | −1 |
| 3 | x | − | −1 |
| 4 | x | − | +1 |
| 5 | y | + | −1 |
| 6 | y | + | +1 |
| 7 | x | + | +1 |
| 8 | x | + | −1 |

(see FIG. 1)

The octantal changes occur at the places t with $x'(t)=0$, $y'(t)=0$ and $x'(t)=y'(t)$ or $x'(t)=-y'(t)$, at which the curve has extreme values in x or y or the slope +1 or −1.

Starting out from the rational coordinate equations, each of the functions $x'(t)$, $y'(t)$, $(x(t)-y(t))'$ and $(x(t)+y(t))'$ has the form $$\frac{u^1 v - u v^1}{v^2}$$

wherein $$u(t) = a_0(1-t)^3 + 3a_1pt(1-t)^2 + 3a_2qt^2(1-t) + a_3t^3$$

designates a cubic Bezier function and v(t) designates the denominator of the equation of the original Bezier curve.

The zero positions of such a function can be determined from the zero positions of the numerator. Because p, q>0, the denominator is always greater than zero. The numerator of a derivative function formally is a polynomial of degree 5. However, since the coefficient of $t^5$ disappears identically independently of the choice of ordinates $a_i$ and weights p, q, it is only necessary to solve an equation of degree 4. It can be assumed that the equations considered in the interval (0,1) have 2 solutions at most, since a rational Bezier curve on its parameter interval qualitatively has the same course as the corresponding polynomial with the weights p=q=1, at which, under the conditions set, the derivatives with respect to t are quadratic polynomials.

For a rapid solution of the equation $u^1v-uv^1=0$ in the interval (1,0), only its left side is shown as a polynomial Bezier function of degree 4

$$B(b_0, b_1, b_2, b_3, b_4; t) = b_0(1-t)^4 + 4b_1t(1-t)^3 + 6b_2t^2(1-t)^2 + 4b_3t^3(1-t) + b_4t^4$$

For this (with the exception of one constant factor), the following formulas apply $$b_0 = 2p(a_1 - a_0),$$

$$b_1 = q(a_2 - a_0),$$

$$b_2 = (a_3 - a_0)/3 + pq(a_2 - a_1)$$

$$b_3 = p(a_3 - a_1),$$

$$b_4 = 2q(a_3 - a_2).$$

In addition to the ordinate vector of the Bezier function, two further variables are introduced and initialized–the starting point s=0 of its parameter interval and the interval length l=1.

The method for determining zero positions consists of several steps:

1. Severing a zero position lying on the edge of the parameter interval.
2. Separating the zero positions and localizing a separate zero position by successively halving the parameter interval.
3. Rapidly localizing a zero position, as soon as the Bezier function no longer has a point of inflection on the reduced parameter interval.
4. The rapid localization of a separated zero position can also be accomplished by a basically different method, namely by the alternating application of osculation parabolas on the left and right edges of the parameter interval.

Re 1.: A zero position lying on the edge of the parameter interval can be recognized by the fact that $b_0=0$ (zero position for t=0) or $b_4=0$ (zero position for t=1). The following transformations of the Bezier function $B(b_0, b_1, b_2, b_4; t)$ to $B(c_0, c_1, c_2, c_4; t)$ represents a polynomial of a degree decreased by 1, which has all the original zero positions with the exception of that lying at the edge:

In the event that $b_0=0$, $$c_0 = 4b_1,$$

$$c_1 = b_1 + 3b_2/2,$$

$$c_2 = b_2 + 2b_3/3,$$

$c_3 = b_3 + b_4/4,$ $c_4 = b_4.$

In the event that $b_4 = 0$, $c_0 = b_0,$ $c_1 = b_1 + b_0/4,$ $c_2 = b_2 + 2b_1/3,$ $c_3 = b_3 + 3b_2/2$ $c_4 = 4b_3.$ Re 2: The proposed method for calculating the zero positions provides an upper and lower limit for each of the zero positions in the parameter interval (0,1). The difference between the two limits can be made smaller than a specified error delta, so that the curve points in the specified grid, calculated at the average values of the limits, are sufficiently close to the dividing positions of the octantal arcs. The method commences with a successive halving of the parameter interval.

The algorithm of de Casteljau permits a polynomial Bezier function $B(a_0 \ldots, a_n; t)$ to be severed at $t = t_0$ and divided into two Bezier segments $B_1(b_0 \ldots, b_n; t)$ and $B_2(c_0 \ldots, c_n; t)$. For the above $$B_1(b_0 \ldots, b_n; t) = B(a_0 \ldots, a_n; t_0 * t),$$

$$B_2(c_0 \ldots, c_n; t) = B(a_0 \ldots, a_n; t_0 + (1-t_0)*t),$$

for $0 < t < 1$.

The derived segments $B_1$ and $B_2$ represent the two parts of the Bezier function B once again as Bezier functions over (1,0). It is therefore necessary to carry along s (starting point) and s (length) in the variables, to which section of the parameter interval of the starting function in each case one segment corresponds.

The starting points and the interval lengths of the severed segments are calculated according to $s(B_1) = s(B),\ l(B_1) = t_0 * l(B),$ $s(B_2) = s(B) + t_0 * l(B),\ l(B_2) = (l - t_0) * l(B).$ In the case that n=4, the computing steps for the severing advisably are organized according to the following schedule:

$b_0 := a_0$ $b_1 := a_0 + t_0 * (a_1 - a_0)$ $b_2 := a_1 + t_0 * (a_2 - a_1)$ $c_2 := a_2 + t_0 * (a_3 - a_2)$ $c_3 := a_3 + t_0 * (a_4 - a_3)$ $c_4 := a_4$ $c_1 := b_2 + t_0 * (c_2 - b_2)$ $b_2 := b_1 + t_0 * (b_2 - b_1)$ $c_2 := c_2 + t_0 * (c_3 - c_2)$ $b_3 := b_2 + t_0 * (c_1 - b_2)$ $c_1 := c_1 + t_0 * (c_2 - c_1)$ $b_4 := b_3 + t_0 * (c_1 - b_3)$ $c_0 := b_4$

The following procedure is used to separate the zero positions of $B(a_0 \ldots a_4; t)$. After any zero positions lying on the edge are severed, the two ordinates $a_0$ and $a_4$ are not equal to zero. If they have different algebraic signs, at least one, in the general case an uneven number of zero positions lie in the parameter interval (s(B), s(B)+l(B)) of the starting function. However, since at most two can occur for the Bezier functions under consideration, precisely one exists. This is already separated and lies between the limits s(B) and s(B)+l(B).

A differentiation is made when $a_0$ and $a_4$ have the same algebraic sign (perhaps are positive).

If $a_1$, $a_2$ and $a_3$ are also greater than zero, there can be no zero position, because each value B(t) then lies in the parameter interval between the maximum and the minimum of all $a_i$. (An analogous conclusion is reached if the ordinates, without exception, are strictly negative.)

However, if the ordinates $a_1$ to $a_3$ are less than or equal to zero, then the Bezier function can have either no or two zero positions. B(t) must then be severed at $t = ½$ and each of the two segments analyzed in the manner described. In so doing, if a Bezier function B'(t) with l(B')<delta is reached without the possibility of reaching a conclusion concerning its zero positions, the halving can be terminated. Within the accuracy of the calculation, any zero positions still present can be regarded as double zero positions and have no significance for digitizing the starting curve. They correspond to a point of inflection of the functions x(t), y(t), x(t)+y(t) or x(t)−y(t), which are not differentiated with respect to t.

After the separation of the zero position(s), a successive halving of the parameter interval is continued in each case with the Bezier segment $B(a_0 \ldots, a_4; t)$, for which $a_0$ and $a_4$ have different algebraic signs, until either l(b)<delta (at which point the desired accuracy is reached), or until one of the following conditions is fulfilled:

$$a_4 - a_3 >= a_3 - a_2 >= a_2 - a_1 >= a_1 - a_0 \qquad (A)$$

or $$a_4 - a_3 <= a_3 - a_2 <= a_2 - a_1 <= a_1 - a_0 \qquad (B)$$

According to a known property of the Bezier functions, the second derivative of B(t) on (1,0) is then positive at (A) (negative at (B)) and the function has no point of inflection there. With that, it is ensured that the monotony of the ordinate differences that has set in is also retained for the subsequent interval divisions.

The Bezier polygon of $B(a_0 \ldots, a_4; t)$ with the corner points $$P_i = (i/4, a_i),\ (i = 0, \ldots, 4)$$

always contains the graph of B(t) within its convex envelope. Under the assumptions concerning the ordinate differences, the convex envelope of the corner points lies completely above the Bezier polygon at (A) and below it at (B). Therefore this applies also for the graphs of B(t). Because of this property, it is possible to proceed to the quick inclusion of the zero position.

Re 3.: The quick inclusion of the zero positions is based on a combination of the simple secant method with a modified tangent method, which couples the advantages of both methods. It makes use of the fact that, as the refinement of the interval progresses, the sides of the Bezier polygons approximate the graph of the Bezier function very well.

In case A, we make the assumption without real limitation that, if $a_0<0$ and $a_4>0$, then k is determined unambiguously by $a_k<=0$, $a_{k+1}>0$. The side of the Bezier polygon intersects the t axis between $P_k$ and $P_{k+1}$ at $$t_1 = \frac{k + a_k}{4(a_k - a_{k+1})}$$

This value is an upper limit for the zero position of B(t), since the graph of B(t) lies above the Bezier polygon. With that, $B(t_1)>=0$. According to the algorithm of de Casteljau, B(t) is now severed at $t=t_1$ and the left segment $B_1$ (t) is considered further. When $B_1$ (t)=0, the zero position of the starting function is equal to $s(B_1)+l(B_1)$; otherwise, the intersection $$t_2 = b_0/(b_0 - b_4)$$

of the connecting segment of the polygonal corner point (0, $b_0$) and (1, $b_4$) with the t axis is calculated for $B_1(t)=B_1$ ($b_0$ ..., $b_4$; t). This segment lies above the graph of $B_1(t)$; $t_2$ therefore is a lower limit for the zero position of $B_1(t)$. With $t=t_2$, the severing of $B_1(t)$ is carried out once again, after which the right segment $B_2(t)$ is used further. Later on, a polygonal side step and a secant step are to be carried, until the interval length parameter l is smaller than the specified limit delta. $S(B)+l(B)/2$ then is a suitable approximation of the zero position sought. In case B, the analogous assumption is made that $a_0<0$ and $a_4>0$. The subscript k is defined by $a_k<=0$, $a_{k+1}>0$.

$$t_1 = \frac{k + a_k}{4(a_k - a_{k+1})}$$

is calculated as the lower limit for the zero position of B(t), since the Bezier polygon lies above the graph of B(t). B(t) is severed at $t=t_1$; the right segment $B_2(t)$ then contains the zero position. If $B_2(0)=0$, then the zero position of the starting function is calculated to be $s(B_2)$; if not, the intersection of the secant with the t axis $$t_2 = c_0/(c_0 - c_4)$$

is calculated from the ordinates $c_0$ and $c_4$ of $B_2(t)$. It provides an upper limit for the zero position of $B_2(t)$; this Bezier function is therefore to be severed at $t=t_2$ and the left segment is to be divided further.

Here also, a polygonal side step and a secant step is to be carried out by the method described, until l<delta for the length parameter. Then $s(B)+l(B)/2$ is a suitable approximation for the zero position sought.

Re 4: There is a further method of successively including a separated zero position of a Bezier function $B(a_0 ..., a_4; t)$. It is not the interval center that is used for dividing the parameter interval by the algorithm of de Casteljau but the zero positions in [1,0] of suitably selected quadratic Bezier functions $B_x$ ($a_0$, x, $a_4$; t). At the edge of the interval, these functions coincide with the specified Bezier function. They therefore have precisely one zero position in [1,0]. Over parameter x, it is possible to achieve that a contact of the second order of B and $B_x$ occurs for $t=0$ or $t=1$ ($B_x$ is an osculating parabola).

The general form of the zero positions of $B_x$ is $$t_1 = a_0/(a_0 - x + sqrt(x^2 - a_0 a_4)),$$

$$t_2 = a_0/(a_0 - x + sqrt(x^2 - a_0 a_4)).$$

When $a_0>0$, $t_1$ is in [0,1]; otherwise, the formula for $t_2$ is to be selected for determining the interval division point.

For $x=2a_1-a_0$, the osculating parabola at the left edge is obtained and for $x=2a_3-a_4$, the osculating parabola at the right edge. The proposed method for including the zero position of $B(a_0 ... a_4; t)$ with $a_0 a_4 <0$ consists therein that an interval division is carried out by the method of de Casteijau at the zero position in (0,1) of an osculating parabola resulting for $x=2a_1-a_0$ or $x=2a_3-a_4$. This division provides two segments $B_1(b_0 ... b_4; t)$ and $B_2(c_0 ... c_4; t)$. As described in item 2., the interval parameters s(B) and l(B) are carried along. If $b_4=c_0=0$, then the zero position sought is determined. Otherwise, either $b_0*b_4<0$, in which case, segment $B_1$ contains the zero position of B, or $c_0*c_4<0$, in which case the inclusion with segment $B_2$ is continued. The next interval division steps are carried out alternately with the zero position of the respective other osculating parabola of the segment. By these means, a rapid inclusion of the zero position is attained from above as well as from below. The method ends once again when the length parameter of a segment is smaller than the error limit delta. 2. Determining the Implied Curve Equation $f(x,y)=0$ From the parametric representation (x(t), y(t)) of the Bezier curve, an implied polynomial representation $$f(x,y)=ax^3+bx^2y+cxy^2+dy^3+ex^2+fxy+gy^2+hx+iy+j=0$$

is produced by eliminating the parameter t. According to J. Hoschek, D. Lasser: Gryndlagen der geometrischen Datenverarbeitung (Fundamentals of Geometric Data Processing), B. G. Teubner 1989, the so-called Bezout resultant of the curve provides a determinate form of f. The following formulas, which are advantageous computationally, can be derived from the formulas given there.

If the control points of the Bezier curve X(t) are designated as $X_i=(x_i,y_i)$ $(0<=i<=3)$, the weights at $X_1$ and $X_2$ are designated p and q and the determinants $$D_{ij} = r_i * r_j * \begin{vmatrix} 1 & x & y \\ 1 & x_i & y_i \\ 1 & x_j & y_j \end{vmatrix} \quad (0 <= i < j <= 3)$$

are introduced, wherein $r_0=1$, $r_1=3p$, $r_2=3q$, $r_3=1$, then $$f(x,y) = \begin{vmatrix} D_{23} & D_{13} & D_{03} \\ D_{13} & D_{12}+D_{03} & D_{02} \\ D_{03} & D_{02} & D_{01} \end{vmatrix} = 0$$

is an implied representation of the curve X(t).

For calculating the polynomial coefficients of f, the element in cell m and n of this determinant is fixed at $u_{mn}x + v_{mn}y + w_{mn}$.
Then $a=\det(u_{mn})$, $d=\det(v_{mn})$, $j=\det(w_{mn})$, $e=(f(1,0)+f(-1,0))/2-j$, $h=(f(1,0)+f(-1,0))/2-a$ $g=(f(0,1)+f(0,-1))/2-j$ $i=(f(0,1)+f(0,-1))/2-d$, $b=(f(1,1)+f(-1,1))/2-f(0,1)-e$, $c=(f(1,1)+f(1,-1))/2-f(1,0)-g$ $f=e+g+j-(f(1,-1)+f(-1,1))/2$ wherein $f(1,0)=det(w_{mn}+u_{mn})$, $f(-1,0)=det(w_{mn}-u_{mn})$, $f(0,1)=det(w_{mn}+v_{mn})$, $f(0,-1)=det(w_{mn}+v_{mn})$, $f(1,1)=det(w_{mn}+u_{mn}-v_{mn})$, $f(1,-1)=det(w_{mn}+u_{mn}-v_{mn})$, $f(-1,1)=det(w_{mn}-u_{mn}+v_{mn})$.

3. Determination of the Parameters Values of the Self-Intersection of the Implied Curve When an octantal arc is generated, a decision is made at a test point $X_i$ by means of the algebraic sign of $f(x_i, y_i)$, which of two grid points is closer to the curve that is to be digitized. The allocation between algebraic sign and grid point to be selected is, however, reversed when the curve crosses a double point of the implied curve (enters or leaves a loop). This effect also occurs when the specified Bezier curve has no double point but is cut by its continuation on the whole plane. For this reason, additional arc divisions may be necessary (at most two for cubic Bezier curves).

The parameter values of the dividing points can be determined as follows: M is the 4×3 matrix $$\begin{pmatrix} x_0 & y_0 \\ x_1 & y_1 \\ x_2 & y_2 \\ x_3 & y_3 \end{pmatrix}$$

with the control points of the Bezier curve. $D_i$ (0<=i<=3) designates the determinants of the matrix arising from M by deleting the ith line, divided by $r_i$, wherein $r_0=1$, $r_1=3p$, $r_2=3q$, $r_3=1$.

If $$a_0 = \begin{vmatrix} D_1 & d_2 \\ D_2 & D_3 \end{vmatrix}, a_1 = \begin{vmatrix} D_0 & D_1 \\ D_2 & D_3 \end{vmatrix} /2 \text{ and } a_2 = \begin{vmatrix} D_0 & D_1 \\ D_1 & D_2 \end{vmatrix}$$

then the parameter values of the self-intersection are given by the solutions of the quadratic equation in Bezier form $$a_0(1-t)^2+2a_1t(1-t)+a_2t^2=0.$$

For this, only the zero positions lying in the parameter interval (0,1) are taken into consideration for the additional arc division.

The occurrence of a double zero position of this equation in the interval (0,1) is an indication of a singularity of the Bezier curve (the loop degenerates into a point). The method of incremental digitizing cannot be used in a neighborhood of the singularity. When Bezier curves of this type occur, they must be divided by means of the algorithm of de Casteljau, so that the critical neighborhood of the singularity can be digitized by a conventional, non-critical method.

Some comments concerning the derivation of the quadratic equation: In a double point $(x_d, y_d)$ of the implied curve, $f_x(x_d, y_d)=0$ for the partial derivatives of f as well as of $f_x(x_d, y_d)=0$. Starting out from the polynomial f, which is cubic in x and y, $f_x$ and $f_y$ are quadratic polynomials. If the rational cubic Bezier functions x(t) and y(t) are inserted in the equations $f_x(x,y)=3ax^2+2bxy+cy^2+2ex+fy+h=0$, $f_y(x,y)=bx^2+2cxy+3dy^2+fx+2gy+i=0$ and both are multiplied by the square of the common denominator of x(t) and y(t), two equations of degree 6 in t, $f_x(t)=0$ and $f_y(t)=0$ are obtained, for which the coefficients of the control points $X_i$ and the weights p,q depend on the Bezier curve. When there is a double point, there are two parameter values $t_1$ and $t_2$, which satisfy both equations. Therefore $f_x(t)$ and $f_y(t)$ have a common quadratic factor $(t-t_1)(t-t_2)$. The concrete form of the this factor was derived with the help of a formula manipulation system from the Bezout resultant for the Bezier curve.

4. Transformation of a Partial Arc into the Standard Position

The coordinates of the points $X_a=(x_a, y_a)$ and $X_e=(x_e, y_e)$ are calculated from the parameter values $t_a$ for the starting point and $t_e$ for the end point of a partial arc of a Bezier curve using the parametric equation $X(t)=(x(t), y(t))$. The assumption has been made that the partial are lies completely in the 8 octants and the octant division was carried out.

The standard position of an octant arc is characterized in that $x_e >= x_a$, $y_e >= y_a$ and $d_x = x_e - x_a >= d >= d_y = y_e - y_a$. If an octantal are is not present in the standard position, it can be brought into the standard position by one or more of the transformations negation in x, negation in y or exchange of x and y at points $X_a$ and $X_e$ as well as at the implied curve equation. Advisably, a local copy of the coefficient vector (a . . . , j) of the polynomial f is used for digitizing the octant arc, the transformations carried out are noted in a variable arc type, and the necessary transformations are carried out in the sequence below:

1. When $x_a > x_e$, then the negation is to be carried out in x. For this purpose, $x_a := -x_a, x_e := -x_e$ and the coefficients a, c, f and h (of $x^3$, $xy^2$, xy and x, which contain x raised to odd powers) of the polynomial f(x,y) are negated. The remaining coefficients of f stay unchanged. The negation in x is to be characterized in the variable arc type.

2. When $y_a > y_e$, then the negation must be carried out in y. For this purpose, $y_a := -y_a, y_e := -y_e$ and the coefficients b, d, f and i (of $x^2y$, $y^3$, xy and y, which contain y raised to odd powers) of the polynomial f(x,y) are negated. The remaining coefficients of f stay unchanged. The negation in y is to be characterized in the variable arc type.

3. When (for the possibly transformed values) $x_a+y_e > x_e+y_a$ ( that is, $y_e-y_a > x_e-x_a$) x and y must be exchanged. For this purpose, $x_a <-> y_a, x_e <-> y_e$ as well as a<->d, b<->c, e<->g, h<->i (the coefficients of $x^3$ and $y^3$, $x^2y$ and $xy^2$, $x_2$ and $y_2$, x and y, which contain x and y raised to an odd power) of the polynomial f(x,y) are exchanged. The remaining coefficients of f stay unchanged. The exchange of x and y is to be characterized in the variable arc type.

5. Digitizing a Partial Arc in Standard Position

It is assumed that the starting point $X_a=(x_a, y_a)$ and the end point $X_e=(x_e, y_e)$ of the exact arc of a curve are available in calculated form. The algebraic sign of the transformed polynomial is selected so that f(x,y)>0 for points below the arc.

Since the direction of progress of a standard arc is the x direction with increasing x values, the digitized arc proceeds between the discrete abscissas $x_0$=ceil($x_a$) and $x_2$=floor($x_e$) (the functions ceil(x) and floor(x) designate the smallest whole number larger than or equal to x or the largest whole number smaller than or equal to x). Due to the octantal division, it is ensured on the interval ($x_a$, $x_e$) that the slope of the arc lies between 0 and 1 inclusive. Because $x_0-x_a<1$, the ordinate of the curve point to the abscissa $x_0$ on the arc under consideration lies between $y_a$ and $y_a+1$. The grid point at the abscissa $x_0$ closest to the curve accordingly lies between $$\text{round}(y_a)=\text{floor}(y_a+0.5)$$

and $$\text{round}(y_a+1)=\text{floor}(y_a+1.5)$$

Therefore, $$(x_0, \text{floor}(y_a+0.5)+0.5)$$

is selected as test point for the decision concerning the grid point closely adjacent to the curve, the starting point of the digital arc.

If $f(\text{ceil}(x_a), \text{round}(y_a)+0.5)<0$, the test point lies above the exact arc; with that, $y_0$=round($y_a$) is the ordinate of the starting point. In the other case, $y_0$=round($y_a$)+1 is to be selected as ordinate of the starting point. (In the case of this procedure, it may happen that, due to the arc division, a grid point is omitted at the octantal dividing points of the Bezier curve at slope +1 or −1. This is avoided by including the grid point ($x_0-1$, $y_0-1$) before the starting point in the case in which $y_0-y_a>1$.)

Further grid points are generated in principle by the repetition of the evaluation of the algebraic sign of the polynomial in continuous test points. Starting out from an already determined grid point (x,y) of the digital approximation, only the ordinates y or y+1 come into consideration as candidates for the grid point to the abscissa x+1. The midpoint (x+1, y+0.5) therefore is the test point for making the decision concerning the grid point with a minimum approximation error. The number of steps to be carried out arises out of the difference $x_1-x_0$. The special feature of the proposed method consists therein that the polynomial is evaluated in consecutive test points incrementally from the preceding polynomial value and the prepared correction values. These are each to be actualized by a few additions in the form of the transition to the next test point.

$f_p$ designates the increase in f(x,y) when going from test point (x,y) to the next test point by increments in both coordinate directions, that is, $$f_p(x+1, y+1)=f(x,y).$$

This transition is referred to as a p transition.

Correspondingly, $f_m$ designates the increase in f(x,y) when changing over from test point (x,y) to the next test point by an increment in the x direction, that is, $$f_m(x,y)=f(x+1, y)=f(x,y).$$

This transition is referred to as an m transition.

Analogously, we agree to represent the changes of this and further increases by $$f_p*(x,y)=f*(x+1, y+1)=f*(x,y),$$

$$f_m*(x,y)=f*(x+1, y)=f*(x,y),$$

wherein * represents a finite sequence of p or m transitions.

The function $f_p$* gives the value, by which the functional value of f* must be corrected for a p transition. The function $f_m$* gives the value, by which the functional value of f* must be corrected for an m transition.

Direct calculations provide the identities $$f_{mp}(x,y)=f_{pm}(x,y)$$

and $$f_{mmp}(x,y)=f_{mpm}(x,y)=f_{pmm}(x,y),$$

$$f_{mpp}(x,y)=f_{pmp}(x,y)=f_{ppm}(x,y)$$

for any x,y. Beyond this, the increases of the third order of the cubic polynomial f are constant.

Accordingly, for the incremental evaluation of f at the test points, in each case 10 parameters must be calculated—the function value f, the corrections of the first order $f_m$ and $f_p$, the corrections of the second order $f_{mm}$, $f_{pm}$ and $f_{pp}$ as well as the corrections of the third order $f_{mmm}$, $f_{pmm}$, $f_{ppm}$ and $f_{ppp}$. The last 4 have to be determined only once per arc as constants. The remaining 6 are actualized incrementally depending on the algebraic sign decision made with the help of their already calculated increases.

In the case of a p transition, the following additions must be carried out:

$$f:=f+f_p,$$

$$f_p:=f_p+f_{pp},$$

$$f_m:=f_m+f_{pm},$$

$$f_{pp}:=f_{pp}+f_{ppp},$$

$$f_{pm}:=f_{pm}+f_{ppm},$$

$$f_{mm}:=f_{mm}+f_{pmm}.$$

In the case of an m transition, the following additions must be carried out:

$$f:=f+f_m,$$

$$f_p:=f_p+f_{pm},$$

$$f_m:=f_m+f_{mm},$$

$$f_{pp}:=f_{pp}+f_{ppm},$$

$$f_{pm}:=f_{pm}+f_{ppm},$$

$$f_{mm}:=f_{mm}+f_{mmm}.$$

The formulas for the starting calculation in the first test point (x,y) are:

$f_m(x,y)$ and $f_p(x,y)$ are calculated most advantageously by means of their definition equation.

$$f_{pp}(x,y)=(6a+4b+2c)x+(2b+4c+6d)y+6(a+b+c+d)+2(e+f+g),$$

$$f_{pm}(x,y)=(6a+2b)x+(2b+2c)y+6a+3b+c+2e+f,$$

$$f_{mm}(x,y)=6ax+2by+6a+2e,$$

$$f_{ppp}=6(a+b+c+d),$$

$$f_{ppm}=6a+4b+2c,$$

$$f_{pmm}=6a+2b$$

$$f_{mmm}=6a$$

All calculations are to be carried out in the floating decimal point format with increased accuracy, in order to limit the effects of rounding off errors. Although the speed is slower than in the case of the integer format, a high rate of generating grid points can be reached. Implementing the method on a TR800-20 Transputer required 11 microseconds per grid point.

When the proposed method is employed for generating curves in very high resolution, the problem of the accumulation of rounding off errors can be rendered harmless owing to the fact that the increases of higher order are quantitatively very much smaller and, with that, more absolutely accurate than the function values or the increases of lower order. If the required accuracy when generating very long arcs nevertheless is impaired due to accumulated rounding off errors, the starting calculation can be called in once again after a fixed number of points have been generated.

6. Traversing the Complete Bezier Curve

For generating an octantal arc in the standard position, it was assumed that $f_y(x_i, y_i) < 0$ at some internal point $(x_i, y_i)$ of the arc. By means of going around a full circle $f(x,y) = r^2 - x^2 - y^2 = 0$, consideration shall now be given to the requirements, which are to be met by the untransformed arcs in all 8 starting positions, so that this condition is fulfilled after the transformation into the standard position. In this example, the prerequisite for the 7th octant (standard position) is fulfilled.

It should be taken into consideration that the negation in x converts $f_x$ into $-f_x$, the negation in y converts $f_y$ into $-f_y$ and the exchange of x and y exchanges $f_x$ for $f_y$.

| Octant | Partial Derivative orthogonal to the Direction of Advance | Trans- formation $x \rightarrow -x$ | $y \rightarrow -y$ | Transformed into Standard Position $x \leftrightarrow y$ | |
|---|---|---|---|---|---|
| 1 | $f_x < 0$ |   | + | + | $f_y < 0$ |
| 2 | $f_x < 0$ | + | + | + | $f_y > 0$ |
| 3 | $f_y > 0$ | + | + |   | $f_y < 0$ |
| 4 | $f_y > 0$ | + |   |   | $f_y > 0$ |
| 5 | $f_x > 0$ | + |   | + | $f_y < 0$ |
| 6 | $f_x > 0$ |   |   | + | $f_y > 0$ |
| 7 | $f_y < 0$ |   |   |   | $f_y < 0$ |
| 8 | $f_y < 0$ |   | + |   | $f_y > 0$ |

Figure 2:
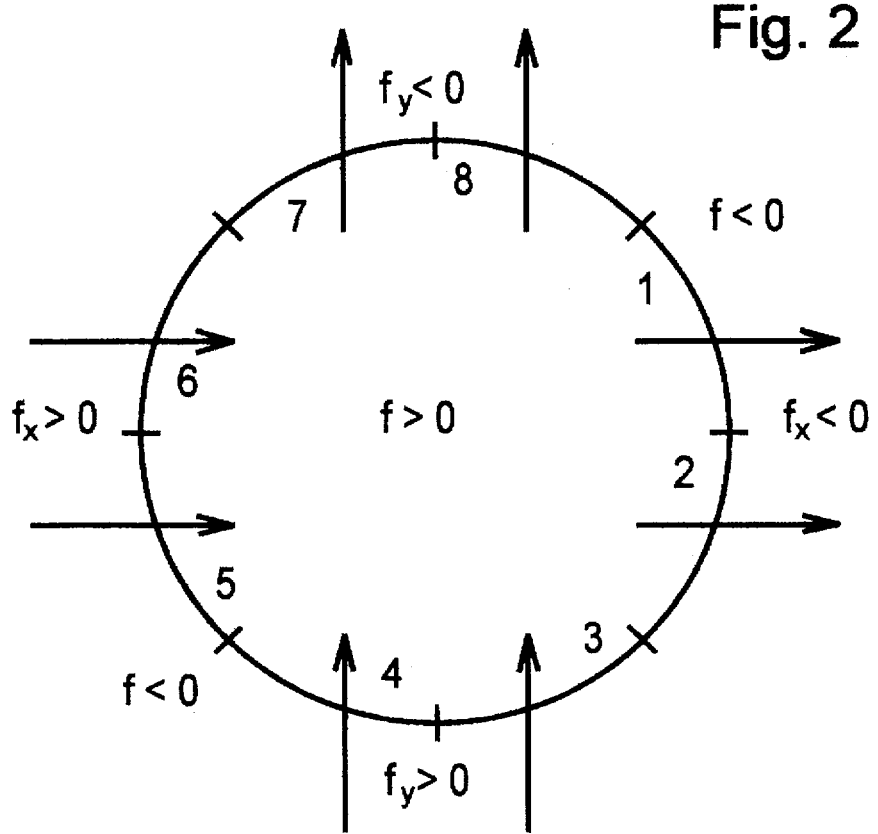
FIG. 2 shows the determination of zero positions.

(See FIG. 2)

It can be seen from this Table that, for the first arc of the curve generation, the following must be determined at any internal point of the arc.

(Rule 1)

the algebraic sign of $f_x$, in the event that the arc is in octants 1, 2, 5 or 6, the algebraic sign of $f_y$, in the event that the arc is in octants 3, 4, 7 or 8.

In order to attain $f_y < 0$ after the transformation into the standard position, the algebraic sign of the polynomial f must be selected so that the partial derivative is orthogonal to the direction of advance on the first arc.

(Rule 2)

is less than 0 for the octants 1, 4, 6 or 7, is greater than 0 for the octants 2, 3, 5 or 8.

It is furthermore evident from this Table that, when traversing the complete Bezier curve, the algebraic sign of the polynomial f has to be inverted in each octantal dividing point with transition to the adjacent octant (corresponding to the full circle). The same is true when passing though a dividing point, which corresponds to a double point of the implied curve. With this, it becomes unnecessary to calculate the algebraic sign of the partial derivative orthogonal to the direction of advance for the second and further arcs of the Bezier curve.

With that, the generation of the complete Bezier curve can be described as follows. The t parameters of the are division points are to be sorted in ascending sequence $$0 = t_0 < t_1 < \ldots < t_n = 1.$$

For $t_0$ and $t_n$, the curve points are already known as specified control points, for the remainder the points $(x(t_k), y(t_k))$ must be calculated. The coefficient vector of the f polynomial is stored once according to the Bezout resultants and once with negated elements $(-f)$. In an internal point of the first arc over $(0, t_1)$, the algebraic sign of a partial derivative of f is usually determined according to rule 1. f is handed over to the arc generation as the local copy of the coefficient vector if it satisfies rule 2; otherwise the vector of $-f$ is handed over. Subsequently, the alternating coefficient vector is to be selected for each adjoining arc.

The advantages achieved with the invention consist particularly therein that that imaging methods can be realized with the inventive method with very high accuracy requirements which, for reasons of the time dependence of the accuracy, depend on short process times, since coordinates can be generated in real time with the method even in the case of very complex geometries. Due to the short process times, the productivity of the applications working with this method (such as laser illuminators (printers, plotters, etc.), microlithography with electron beams or X-ray beams, microsystems technology, binary and integrated optics, production of optical wave guides, 2D robot controls, printing technology and visualization of design data) is increased. For applications, which could be operated only with an increased rate of rejects because it is difficult to maintain the process over a longer period of time, an increase in quality and a decrease in the rate of rejects can be realized because of the distinctly shorter processing times. Time-consuming data preparation processes for converting compact geometrical data into highly resolved control data (offline compiling) can be omitted. There are therefore no interim data sets with a mass data character, which would require extensive storage media and rapid transfer channels to the control device.

I claim:

1. A process for generating plane, curves or contours for representing technical images by consecutively generating coordinates by digitizing parametric, polynominal and rational third order Bezier curves, which comprises (i) decomposing said Bezier curves, the curves being of the form $$X(t) = \frac{X_0(1-t)^3 + 3pX_1t(1-t)^2 + 3qX_2t^2(1-t) + X_3t^3}{(1-t)^3 + 3pt(1-t)^2 + 3qt^2(1-t) + t^3}$$

$(0 <= t <= 1)$ with the control points $X_i = (x_i, y_i)$ $(0 <= i <= 3)$, the weights $p, q > 0$, and the parameters t with $0 <= t <= 1$ into octantal arcs each having a starting point, an end point, and a slope, for digitizing said curves separately;

(ii) generating said octantal arcs for determining the boundaries thereof by the parameters at the points of the curve where said curve has a slope of 0, $\infty$, 1 or $-1$;

(iii) transforming the curves into an implied form $f(x,y) = 0$ for freeing said curves from parametrization;

(iv) performing an additional curve division of the Bezier curves at the places at which f(x,y)=0 intersects itself;

(v) calculating from the corresponding parameter values coordinates of all dividing points together with the starting and end points of the original curve;

(vi) forming starting and end points of all individual arcs;

(vii) bringing the arcs in a standard position through reflections at one or more of the three axes x=0, y=0, or x=y, (viii) determining the coordinates ($x_0$, $y_0$) adjacent to the starting point of the arc for commencing generation of digital approximation;

(ix) insuring that the slope of the arc is always between 0 and 1;

(x) calculating the function $f(x_0+1, y_0+\frac{1}{2})$;

(xi) deciding the path of the arc between a coordinate point and a test point by evaluating the algebraic sign of said function $f(x_0+1, y_0+\frac{1}{2})$;

(xii) forming the starting point for the next step from said coordinate point; and (xiii) repeating the steps (iii)–(xii) until the end point of the arc is reached.

2. The method of claim 1, characterized in that the parameter values t for the octantal division are determined owing to the fact that a polynomial, the zero positions of which in the interval (0,1) correspond to the parameter values, is represented as a Bezier Function of degree 4, derived Bezier functions over limited intervals, which are investigated for zero positions, are constructed according to the algorithm of de Casteljau, the zero positions, to begin with, are separated by successive interval halving, a zero position is included by guaranteed upper and lower limits with a specified accuracy initially by successive interval halving, the control polygon of a derived Bezier function is rapidly tested at the same time over the inclusion interval for convexity, when the test is fulfilled, the zero position is enclosed constantly more tightly over the inclusion interval alternately by the points of intersection of the parameter axis with the control polygon or with the secant of the graph of a derived Bezier function.

3. The method of claim 1, characterized in that the parameter values t for the octantal division are determined owing to the fact that a polynomial, the zero positions of which in the interval (1,0) correspond to the parameter values, is represented formulaically as a Bezier function of degree 4, derived Bezier functions over limited intervals, which are investigated for zero positions, are constructed according to the algorithm of de Casteljau, the zero positions, to begin with, are separated by successive interval halving, a zero position is included by guaranteed upper and lower limits up to a specified accuracy alternately by the zero positions of an osculating parabola of the derived Bezier function on the right and left edge of the inclusion interval, each osculating parabola coinciding with the Bezier functions at the two interval ends.

4. The method of one of the claim 1, characterized in that the implied representation of the Bezier curve by a polynomial f(x, y) is obtained from the determinant form of the Bezout resultant, the elements of which are calculated formulaically directly from the control points and weights of the Bezier curve, the coefficients of the polynomial f(x, y) result from the calculation of the polynomial values in 7 points (x, y) and from the evaluation of 10 3-row determinants, from which only simple linear combinations can be formed, the parameter values of a self-intersection of the Bezier curve are determined as solutions of a quadratic equation, the coefficients of which in the Bezier form are represented formulaically from the control points and weights of the Bezier curve.

* * * * *